(12) United States Patent
Misono et al.

(10) Patent No.: US 8,259,256 B2
(45) Date of Patent: Sep. 4, 2012

(54) LIQUID CRYSTAL DISPLAY

(75) Inventors: Kenji Misono, Nara (JP); Shinichi Miyazaki, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 876 days.

(21) Appl. No.: 12/300,214

(22) PCT Filed: Apr. 12, 2007

(86) PCT No.: PCT/JP2007/058058
§ 371 (c)(1),
(2), (4) Date: Nov. 10, 2008

(87) PCT Pub. No.: WO2007/132608
PCT Pub. Date: Nov. 22, 2007

(65) Prior Publication Data
US 2009/0174839 A1 Jul. 9, 2009

(30) Foreign Application Priority Data
May 11, 2006 (JP) ................. 2006-132812

(51) Int. Cl.
*G02F 1/1335* (2006.01)
(52) U.S. Cl. .......................... 349/64; 349/96
(58) Field of Classification Search ...... 349/64, 349/96
See application file for complete search history.

(56) References Cited

U.S. PATENT DOCUMENTS

| | | | | |
|---|---|---|---|---|
| 6,130,735 A * | 10/2000 | Hatanaka et al. | ............ | 349/113 |
| 6,181,399 B1 * | 1/2001 | Odoi et al. | .................... | 349/113 |
| 6,195,140 B1 | 2/2001 | Kubo et al. | | |
| 6,324,011 B1 * | 11/2001 | Higuchi | ........................ | 359/627 |
| 7,327,421 B2 * | 2/2008 | Kaneko | ........................ | 349/114 |
| 2002/0015123 A1 * | 2/2002 | Iwata et al. | ................... | 349/112 |
| 2002/0145688 A1 * | 10/2002 | Sekiguchi | ..................... | 349/114 |
| 2003/0063242 A1 | 4/2003 | Nishimura et al. | | |
| 2003/0081151 A1 * | 5/2003 | Tsuchihashi et al. | ........... | 349/61 |
| 2005/0213003 A1 * | 9/2005 | Kaneko | ......................... | 349/114 |
| 2006/0007102 A1 * | 1/2006 | Yasuoka et al. | ............... | 345/102 |
| 2007/0058127 A1 * | 3/2007 | Mather et al. | ................. | 349/159 |

FOREIGN PATENT DOCUMENTS

| | | | |
|---|---|---|---|
| JP | 09-022011 A | | 1/1997 |
| JP | 2000-75284 A | * | 3/2000 |
| JP | 2000-221483 A | | 8/2000 |
| JP | 2000-221484 A | | 8/2000 |
| JP | 2000-227592 A | | 8/2000 |
| JP | 2001-356338 A | | 12/2001 |

(Continued)

OTHER PUBLICATIONS

Misono et al.: U.S. Appl. No. 12/084,424, filed May 1, 2008.
Official communication issued in counterpart International Application No. PCT/JP2007/058058, mailed on Dec. 24, 2008.

(Continued)

*Primary Examiner* — K. Cyrus Kianni
(74) *Attorney, Agent, or Firm* — Keating & Bennett, LLP (57) ABSTRACT

In a liquid crystal display device of a transflective type, the viewing angle characteristics of displaying in the transmission mode can be sufficiently improved, and yet bright displaying in the reflection mode can be realized. The liquid crystal display device is a liquid crystal display device of a transflective type including a liquid crystal display panel and an illuminator. The liquid crystal display panel includes a first light diffusing element disposed at the viewer's side of a liquid crystal layer and a second light diffusing element disposed at the opposite side of the liquid crystal layer from the viewer.

13 Claims, 8 Drawing Sheets

FOREIGN PATENT DOCUMENTS

| | | | |
|---|---|---|---|
| JP | 2005-099469 A | | 4/2005 |
| JP | 2005-099470 A | | 4/2005 |
| JP | 2005-189890 A | | 7/2005 |
| JP | 2005-1898890 A | * | 7/2005 |

OTHER PUBLICATIONS

Official Communication issued in International Patent Application No. PCT/JP2007/058058, mailed on Jun. 5, 2007.

* cited by examiner

FIG.16
PRIOR ART

LIQUID CRYSTAL DISPLAY

BACKGROUND OF THE INVENTION

1. Field of the Invention

The present invention relates to a liquid crystal display device, and in particular to a liquid crystal display device of a transflective type which is capable of displaying in a transmission mode and displaying in a reflection mode.

2. Description of the Related Art

In recent years, portable electronic devices such as mobile phones and PDAs (Personal Digital Assistants) have been in wide use. In a display section of a portable electronic device, a liquid crystal display device is frequently used because of its advantages in terms of thinness, light weight, and low power consumption.

A liquid crystal display device is not a self-light-emitting type display device such as CRTs and PDPs (plasma display panels). Therefore, in a transmission-type liquid crystal display device, an illuminator called a backlight is provided at the rear surface side of the liquid crystal display panel, and an image is displayed as the transmitted amount of the illumination light from this backlight is controlled by the liquid crystal display panel in a pixel-by-pixel manner.

Liquid crystal display devices of various methods are known. However, some methods (e.g., methods using a TN type or STN type liquid crystal display element) have a disadvantage of narrow viewing angles, and various techniques are under development for overcoming this disadvantage.

As a representative technique for improving the viewing angle characteristics of a liquid crystal display device, there is a method of adding an optical compensation plate. There is also known a method of enhancing the directivity (degree of parallelism) of light which is emitted from a backlight before the light enters a liquid crystal display element, and allowing the light having traveled through the liquid crystal display element to be diffused by a lenticular lens sheet which is disposed at the front surface of the liquid crystal display element (e.g., Japanese Laid-Open Patent Publication No. 9-22011).

Figure 16:
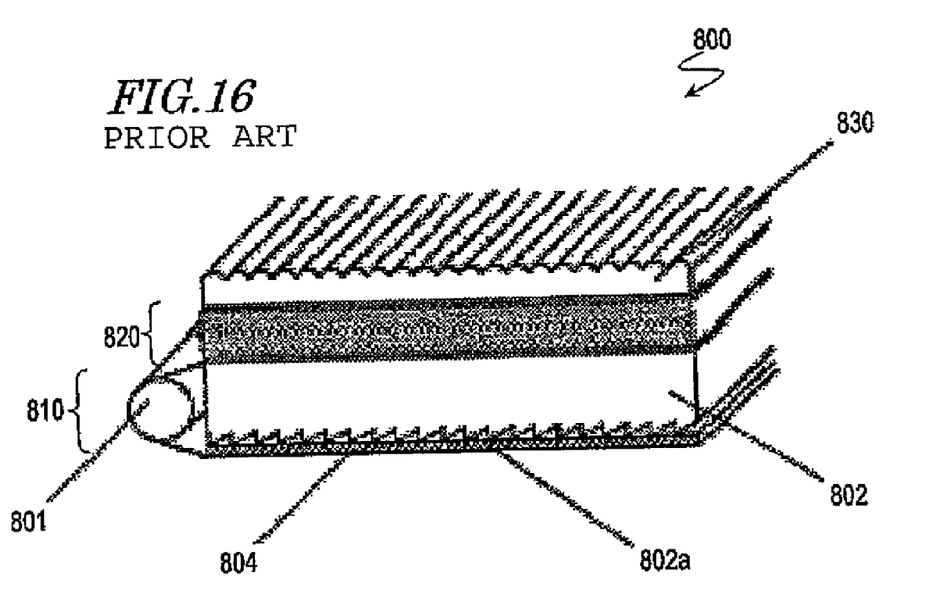
FIG. 16 is a perspective view schematically showing a conventional liquid crystal display device.

FIG. 16 shows a liquid crystal display device 800 disclosed in Japanese Laid-Open Patent Publication No. 9-22011. The liquid crystal display device 800 includes a liquid crystal display panel 820 including a liquid crystal layer (not shown), a backlight 810 disposed at the rear surface side of the liquid crystal display panel 820, and a lenticular lens sheet 830 disposed at the viewer's side of the liquid crystal display panel 820.

The backlight 810 includes a light source 801, a light guiding plate 802 for guiding the light having been emitted from the light source 801 to the liquid crystal display panel 820, and a reflective layer 804 for reflecting the light leaking from the light guiding plate 802 toward the light guiding plate 802. The light guiding plate 802 has an outgoing surface through which light goes out toward the liquid crystal display panel 820, and a rear surface opposing the outgoing surface. A plurality of prisms 802a are provided on the rear surface thereof.

While propagating within the light guiding plate 802, the light having been emitted from the light source 801 is reflected toward the liquid crystal display panel 820 by the prisms 802a on the rear surface, so as to go out through the outgoing surface. Each prism 802a on the rear surface has two slopes that are slanted at respectively different predetermined angles with respect to the outgoing surface, so that the light which is emitted from the backlight 810 has a very strong intensity along the display surface normal direction (frontal direction). In other words, a high directivity is imparted to the light emitted from the backlight 810.

When the light emitted from the backlight 810 has a high directivity, the light traveling through the liquid crystal layer of the liquid crystal display panel 820 can be uniformly modulated (i.e., a uniform retardation can be imparted to the light traveling through the liquid crystal layer). Therefore, the viewing angle dependence of display quality associated with the refractive index anisotropy of liquid crystal molecules can be reduced. As it is, the light having traveled through the liquid crystal display panel 820 has a high directivity, and has a large imbalance in luminance (a very high luminance exists along the display surface normal direction whereas luminances along oblique directions are low). However, through diffusion by the lenticular lens sheet 830, which is a light diffusing element, the luminance imbalance is reduced, and the viewing angle is broadened. As a result, the liquid crystal display device 800 realizes displaying with a wide viewing angle, with a reduced viewing angle dependence in display quality.

On the other hand, in recent years, a liquid crystal display device which is capable of performing high-quality display both outdoors and indoors has been proposed (e.g., Japanese Laid-Open Patent Publication No. 11-101992). This liquid crystal display device is capable of displaying in a transmission mode by utilizing light from a backlight and displaying in a reflection mode by utilizing ambient light (external light), and is called a transflective-type liquid crystal display device.

A transflective-type liquid crystal display device has both of the following features: the low power consumption of a reflection-type liquid crystal display device and the bright and high-contrast-ratio displaying of a transmission-type liquid crystal display device which is free from influences of ambient brightness. Furthermore, it also improves the weakness of a transmission-type liquid crystal display device, i.e., deterioration in visual recognition in a very bright environment of use (e.g., outdoors in fine weather).

However, the transflective-type liquid crystal display device disclosed in Japanese Laid-Open Patent Publication No. 11-101992 lacks a light diffusing element at the viewer's side of the liquid crystal layer, and thus is incapable of performing display with a wide viewing angle. Therefore, it might be conceivable to apply the approach of using a light diffusing element as disclosed in Japanese Laid-Open Patent Publication No. 9-22011 to a transflective-type liquid crystal display device.

However, even if the approach disclosed in Japanese Laid-Open Patent Publication No. 9-22011 is applied to a transflective-type liquid crystal display device as it is, it is difficult to perform high-quality displaying in both the transmission mode and the reflection mode. This is because, when simply a light diffusing element is provided in a transflective-type liquid crystal display device, light which is used for displaying in the transmission mode (light from a backlight) travels through the light diffusing element only once whereas light which is used for displaying in the reflection mode (light from the viewer's side) travels through the light diffusing element twice.

For example, when the haze value (the degree to which light is diffused) of the light diffusing element is optimized for the light which is used for displaying in the transmission mode, the light which is used for displaying in the reflection mode is excessively diffused while traveling through the light diffusing element twice, thus resulting in a dark displaying in the reflection mode.

On the other hand, if the haze value of the light diffusing element is set to be weaker so as not result in a dark displaying in the reflection mode, the light which is used for displaying in the transmission mode travels through the light diffusing element only once and therefore is not sufficiently diffused. As a result, the viewing angle cannot be sufficiently broadened with respect to displaying in the transmission mode.

SUMMARY OF THE INVENTION

In order to overcome the problems described above, preferred embodiments of the present invention, in a liquid crystal display device of a transflective type, sufficiently improve the viewing angle characteristics of displaying in the transmission mode, and yet realize bright displaying in the reflection mode.

A liquid crystal display device according to a preferred embodiment of the present invention is a liquid crystal display device of a transflective type including a liquid crystal display panel having a pair of substrates and a liquid crystal layer provided between the pair of substrates; and an illuminator arranged to emit light toward the liquid crystal display panel, the liquid crystal display device being capable of displaying in the transmission mode by using light from the illuminator and displaying in the reflection mode by using light from a viewer's side, wherein, the liquid crystal display panel includes a first light diffusing element disposed at the viewer's side of the liquid crystal layer and a second light diffusing element disposed at an opposite side of the liquid crystal layer from the viewer.

In a preferred embodiment, the liquid crystal display panel further includes a first polarizer disposed at the viewer's side of the first light diffusing element and a second polarizer disposed at an opposite side of the second light diffusing element from the viewer.

In a preferred embodiment, the first light diffusing element has a haze value which is larger than a haze value of the second light diffusing element.

In a preferred embodiment, the first light diffusing element preferably has a haze value of about 83% or less, for example.

In a preferred embodiment, the first light diffusing element preferably has a haze value of about 70% or more, for example.

In a preferred embodiment, a haze value of the first light diffusing element and a haze value of the second light diffusing element are set so that a haze value of what is obtained by overlaying the first light diffusing element and the second light diffusing element is preferably about 85% or more, for example.

In a preferred embodiment, the pair of substrates are a first substrate disposed at the viewer's side of the liquid crystal layer and a second substrate disposed at the opposite side of the liquid crystal layer from the viewer; and the first light diffusing element is disposed at the viewer's side of the first substrate.

In a preferred embodiment, the pair of substrates are a first substrate disposed at the viewer's side of the liquid crystal layer and a second substrate disposed at the opposite side of the liquid crystal layer from the viewer; and the first light diffusing element is interposed between the first substrate and the liquid crystal layer.

In a preferred embodiment, the pair of substrates are a first substrate disposed at the viewer's side of the liquid crystal layer and a second substrate disposed at the opposite side of the liquid crystal layer from the viewer; and the second light diffusing element is disposed at the opposite side of the second substrate from the viewer.

In a preferred embodiment, the pair of substrates are a first substrate disposed at the viewer's side of the liquid crystal layer and a second substrate disposed at the opposite side of the liquid crystal layer from the viewer; and the second light diffusing element is interposed between the second substrate and the liquid crystal layer.

In a preferred embodiment, the liquid crystal display panel further includes a light reflecting layer interposed between the liquid crystal layer and the second light diffusing element.

In a preferred embodiment, the illuminator preferably has an intensity distribution such that a luminance in directions at an angle of about 30° or more with respect to the display surface normal direction is about 13% or less of a luminance in the display surface normal direction, for example.

In a preferred embodiment, the illuminator preferably has an intensity distribution such that a luminance in directions at an angle of about 30° or more with respect to the display surface normal direction is about 3% or less of a luminance in the display surface normal direction, for example.

In a preferred embodiment, the illuminator includes a light source and a directivity controlling element arranged to control directivity of light emitted from the light source.

A liquid crystal display panel of a transflective-type liquid crystal display device according to a preferred embodiment of the present invention includes a first light diffusing element which is disposed at the viewer's side of a liquid crystal layer and a second light diffusing element which is disposed at the opposite side of the liquid crystal layer from the viewer. As a result, light which is used for displaying in the transmission mode (light from an illuminator) travels through each of the first light diffusing element and the second light diffusing element once (totaling twice), whereas light which is used for displaying in the reflection mode (light from the viewer's side) travels twice through the first light diffusing element only.

Thus, in a liquid crystal display device according to a preferred embodiment of the present invention, the number of times of traveling through the light diffusing element(s) is the same between the light which is used for displaying in the transmission mode and the light which is used for displaying in the reflection mode. Therefore, without excessively diffusing the light which is used for the reflection mode, the light which is used for the transmission mode can be sufficiently diffused. As a result, the viewing angle characteristics of displaying in the transmission mode can be sufficiently improved, and bright displaying in the reflection mode can also be realized.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the drawings. Note that the present invention is not limited to the following preferred embodiments.

Preferred Embodiment 1

Figure 1:
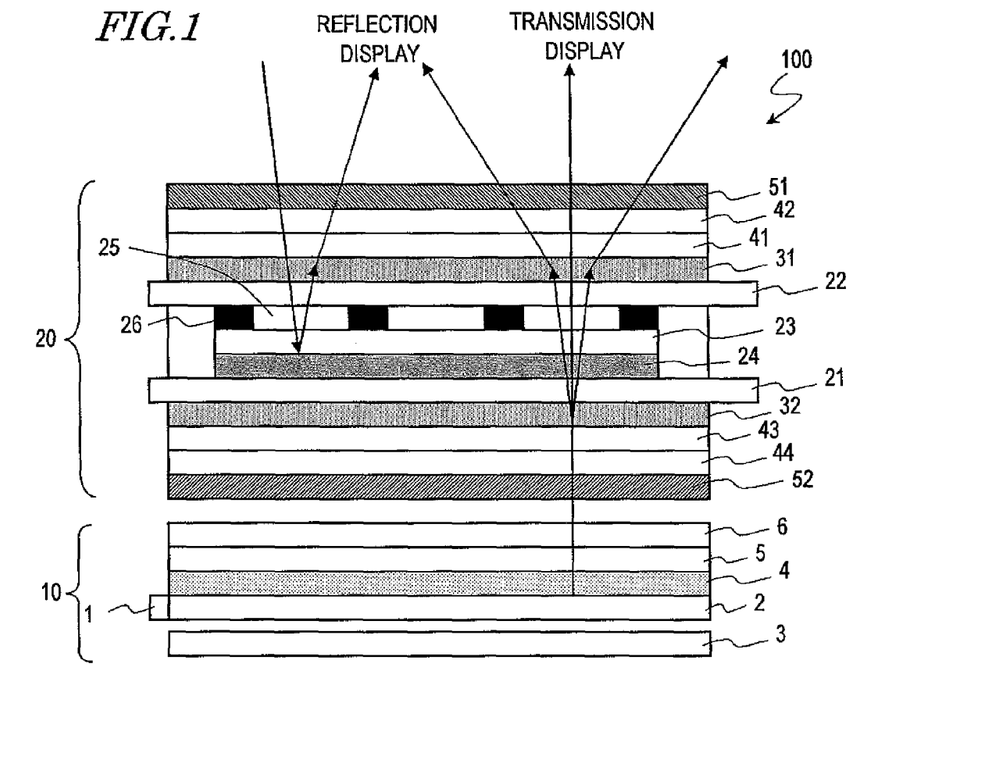
FIG. 1 is a cross-sectional view schematically showing a liquid crystal display device according to a preferred embodiment of the present invention.

FIG. 1 shows a transflective-type liquid crystal display device 100 according to the present preferred embodiment. As shown in FIG. 1, the liquid crystal display device 100 includes a liquid crystal display panel 20 and an illuminator (backlight) 10 arranged to emit light toward the liquid crystal display panel 20.

The liquid crystal display panel 20 includes a pair of substrates 21 and 22, and a liquid crystal layer 23 provided therebetween. On surfaces of the substrates 21 and 22 facing the liquid crystal layer 23, electrodes arranged to apply voltages across the liquid crystal layer 23 and alignment films arranged to define the orientation direction of the liquid crystal layer 23 (neither of them is shown) are provided. Hereinafter, regarding the pair of substrates 21 and 22, the substrate 21 disposed at the illuminator 10 side of the liquid crystal layer 23, i.e., at the opposite side of the liquid crystal layer 23 from the viewer, will be referred to as a "rear substrate", and the substrate 22 disposed at the viewer's side of the liquid crystal layer 23 will be referred to as a "front substrate".

The light reflecting layer 24 is provided on the liquid crystal layer 23 side of the rear substrate 21. The light reflecting layer 24 of the present preferred embodiment is a half mirror which reflects a portion of light and transmits another portion. For example, the half mirror is a thin film having a thickness of about 50 nm, for example, which is formed by vapor-depositing aluminum or silver.

Moreover, on the liquid crystal layer 23 side of the front substrate 22, color filters 25 and a black matrix 26 are provided. The color filters 25 typically include a red (R) color filter, a green (G) color filter, and a blue (B) color filter.

The liquid crystal display panel 20 of the present preferred embodiment includes two light diffusing elements 31 and 32. One of the two light diffusing elements 31 and 32 is disposed at the viewer's side of the liquid crystal layer 23, whereas the other is disposed at the opposite side of the liquid crystal layer 23 from the viewer (i.e., at the illuminator 10 side). Hereinafter, the light diffusing element 31 which is disposed at the viewer's side of the liquid crystal layer 23 will be referred to as a "first light diffusing element", whereas the light diffusing element 32 which is disposed at the opposite side of the liquid crystal layer 23 from the viewer will be referred to as a "second light diffusing element".

In the present preferred embodiment, the first light diffusing element 31 is provided on a surface of the front substrate 22 facing the viewer's side, and phase difference plates 41 and 42 and a polarizing plate (polarizer) 51 are provided in this order upon the first light diffusing element 31. In other words, the phase difference plates 41 and 42 and the polarizing plate 51 are disposed at the viewer's side of the first light diffusing element 31.

On the other hand, the second light diffusing element 32 is provided on a surface of the rear substrate 21 opposite from the viewer, and phase difference plates 43 and 44 and a polarizing plate (polarizer) 52 are provided in this order upon the second light diffusing element 32. In other words, the phase difference plates 43 and 44 and the polarizing plate 52 are provided at the opposite side of the second light diffusing element 32 from the viewer.

In the present preferred embodiment, the two phase difference plates 41 and 42 are interposed between the polarizing plate 51 on the viewer's side and the liquid crystal layer 23, whereas the two phase difference plates 43 and 44 are disposed between the polarizing plate 52 on the illuminator 10 side and the liquid crystal layer 23. Note, however, that the number and positioning of phase difference plates is not limited to what is exemplified herein.

The illuminator 10 emits light having a high directivity. When the light emitted from the illuminator 10 has a high directivity, light traveling through the liquid crystal layer 23 can be uniformly modulated (i.e., a uniform retardation can be imparted to the light traveling through the liquid crystal layer 23), whereby the viewing angle dependence of display quality associated with the refractive index anisotropy of the liquid crystal molecules can be reduced.

The illuminator 10 includes a light source 1 and a light guide plate (light guiding member) 2 for guiding the light emitted from the light source 1 to the liquid crystal display panel 20. The light source 1 is a light-emitting diode (LED) or a cold-cathode tube, for example. In the light guide plate 2, structures for allowing light which has been emitted from the light source 1 and entered inside the light guide plate 2 to go out toward the liquid crystal display panel 20 side are provided. For example, on at least one of the two principal surfaces of the light guide plate 2, prisms or grain is formed.

On the rear surface side of the light guiding plate 2, a reflection sheet 3 is disposed. The reflection sheet 3 allows light leaking from the light guiding plate 2 toward the rear surface to be again reflected toward the light guiding plate 2.

On the front surface side of the light guiding plate 2, a diffusion sheet 4, a lower lens sheet 5, and an upper lens sheet 6 are disposed in this order. The diffusion sheet 4, the lower lens sheet 5, and the upper lens sheet 6 function as directivity control elements for controlling the directivity of light.

Light having been emitted from the light guiding plate 2 is once diffused by the diffusion sheet 4, and thereafter converged by the lower lens sheet 5 and the upper lens sheet 6. For example, a conversion with respect to the up-down direction of the display surface is performed by one of the lower lens sheet 5 and the upper lens sheet 6, whereas a conversion with respect to the right-left direction of the display surface is performed by the other.

Furthermore, the upper lens sheet 6 also functions as a reflection-type polarizing plate. In other words, it transmits only a certain polarization component (specifically, P-polarized light) of light from the lower lens sheet 5, while reflecting any other polarization component (specifically, S-polarized light). The upper lens sheet 6 also functioning as a reflection-type polarizing plate is arranged so that its transmission axis coincides with the transmission axis of the polarizing plate 52 on the rear surface of the liquid crystal display panel 20.

Figure 2:
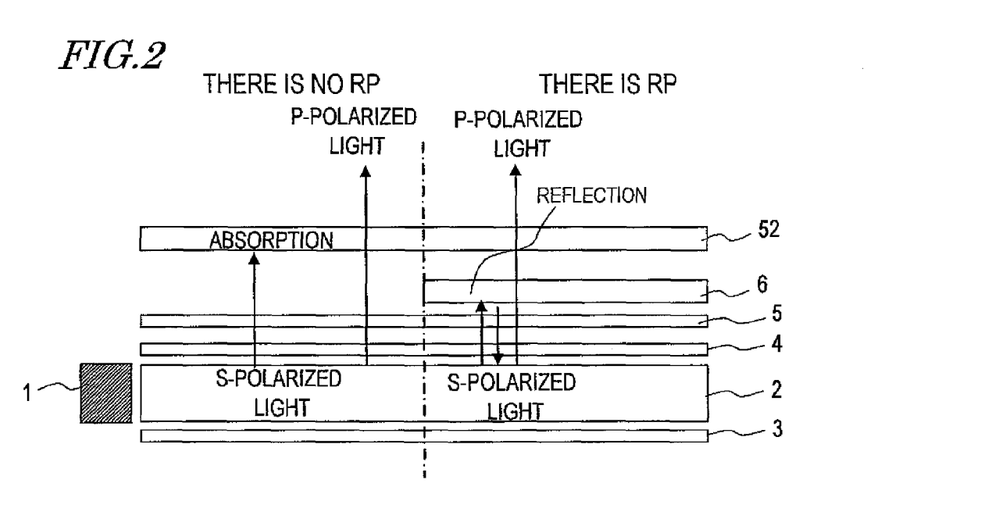
FIG. 2 is a diagram for explaining the function of a lens sheet functioning as a reflection-type polarizing plate.

In the case where the upper lens sheet 6 functioning as a reflection-type polarizing plate is not provided, as shown at the left-hand side of FIG. 2, S-polarized light in the light from the lower lens sheet 5 will be absorbed by the polarizing plate 52, thus being unavailable for displaying.

On the other hand, when the upper lens sheet 6 functioning as a reflection-type polarizing plate is provided, as shown at the right-hand side of FIG. 2, S-polarized light in the light from the lower lens sheet 5 is reflected by the upper lens sheet 6. The reflected S-polarized light travels through the lower lens sheet 5, the diffusion sheet 4, and the light guiding plate 2, and is reflected by the reflection sheet 3, so as to again go toward the upper lens sheet 6. In this process, a portion of the S-polarized light is converted to P-polarized light, and enters the liquid crystal display panel 20 without being reflected by the upper lens sheet 6 or absorbed by the polarizing plate 52. As a result, the efficiency of light utility is enhanced, and the luminance is improved. For the upper lens sheet 6 functioning as a reflection-type polarizing plate, BEF-RP manufactured by Sumitomo 3M Limited can be used, for example.

Light having been emitted from the illuminator 10 enters into the liquid crystal display panel 20 via the polarizing plate 52, and thereafter travels through the phase difference plates 44 and 43, the second light diffusing element 32, the rear substrate 21, the light reflecting layer 24, the liquid crystal layer 23, the color filters 25, the front substrate 22, the first light diffusing element 31, and the phase difference plates 41 and 42 in order. As light becomes modulated in this process, the amount of light transmitted through the polarizing plate 51 on the viewer's side is controlled, whereby displaying in the transmission mode is performed.

Since the illuminator 10 is able to emit highly directive light, in the transmission mode where displaying is performed by using light from the illuminator 10, the viewing angle dependence of display quality associated with the refractive index anisotropy of liquid crystal molecules can be reduced. Mere use of directive light would result in a large imbalance in luminance (a very high luminance would exist along the display surface normal direction whereas luminances along oblique directions are low). However, in the present preferred embodiment, the light used for the transmission mode is diffused by the first light diffusing element 31 and the second light diffusing element 32, so that the luminance imbalance is reduced, thus broadening the viewing angle.

On the other hand, ambient light (external light) enters into the liquid crystal display panel 20 from the viewer's side via the polarizing plate 51, and thereafter travels through the phase difference plates 42 and 41, the first light diffusing element 31, the front substrate 22, and the liquid crystal layer 23 in order, so as to be reflected by the light reflecting layer 24 and again travel through the liquid crystal layer 23, the front substrate 22, the first light diffusing element 31, and the phase difference plates 41 and 42. As light becomes modulated in this process, the amount of light transmitted through the polarizing plate 51 on the viewer's side is limited, whereby displaying in the reflection mode is performed.

Light which is used for the reflection mode is diffused by the first light diffusing element 31 during the process of entering into the liquid crystal display panel 20 from the viewer's side and being reflected by the light reflecting layer 24 to go out toward the viewer's side. Therefore, unwanted reflections associated with specular reflection at the light reflecting layer 24 are prevented, whereby good white displaying in the reflection mode can be performed. Moreover, the viewing angle is broadened. Note that positioning of the light reflecting layer 24 is not limited to what is exemplified. The light reflecting layer 24 needs only to be interposed between the liquid crystal layer 23 and the second light diffusing element 32.

Thus, the liquid crystal display device 100 is able to perform displaying in the transmission mode, which uses light from the illuminator 10, and displaying in the reflection mode, which uses light from the viewer's side.

The transflective-type liquid crystal display device 100 of the present preferred embodiment includes the first light diffusing element 31 disposed at the viewer's side of the liquid crystal layer 23 and the second light diffusing element 32 disposed at the opposite side of the liquid crystal layer 23 from the viewer. As a result, light which is used for displaying in the transmission mode (light from the illuminator 10) travels through each of the first light diffusing element 31 and the second light diffusing element 32 once (i.e., totaling twice), whereas light which is used for displaying in the reflection mode (light from the viewer's side) travels twice through the first light diffusing element 31 only.

Thus, in the liquid crystal display device 100, the number of times of traveling through the light diffusing element(s) is the same between the light which is used for displaying in the transmission mode and the light which is used for displaying in the reflection mode. Therefore, without excessively diffusing the light which is used for the reflection mode, the light which is used for the transmission mode can be sufficiently diffused. As a result, the viewing angle characteristics of displaying in the transmission mode can be sufficiently improved, and bright displaying in the reflection mode can also be realized. In other words, it is possible to reconcile the transmission mode with a wide viewing angle and the reflection mode with a high reflectance.

Figure 3:
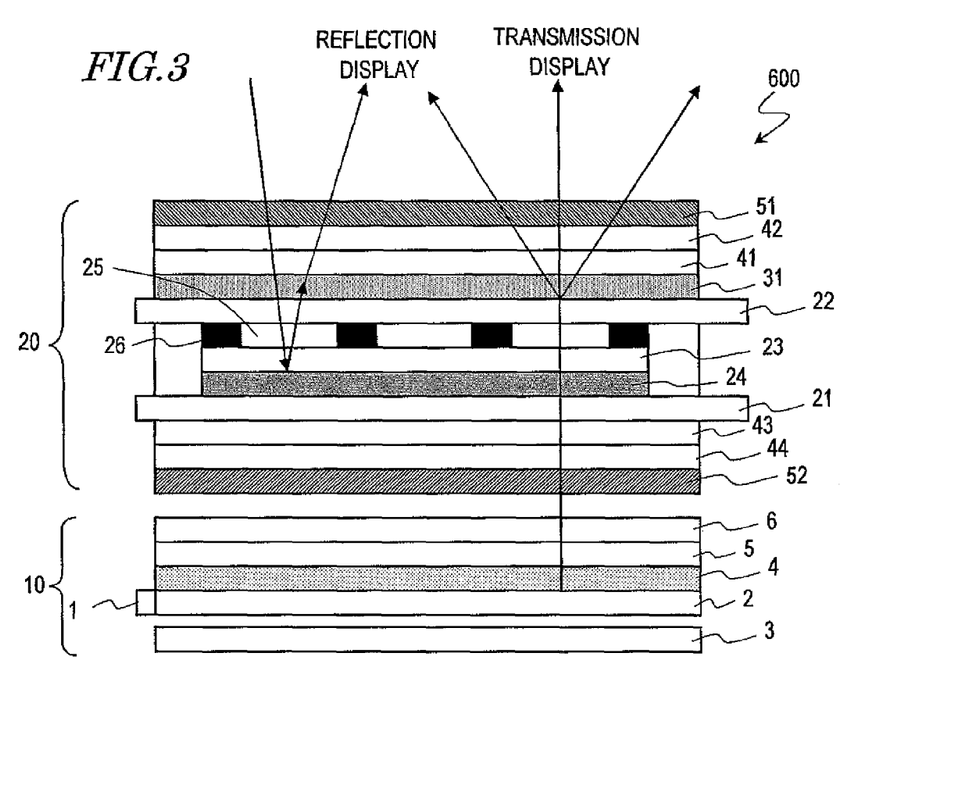
FIG. 3 is a cross-sectional view schematically showing a liquid crystal display device having only one light diffusing element.

On the other hand, in a construction where the light diffusing element 31 is provided only on the viewer's side of the liquid crystal layer 23, as in the liquid crystal display device 600 shown in FIG. 3, light which is used for displaying in the transmission mode (light from the illuminator 10) travels through the light diffusing element 31 only once, whereas light which is used for displaying in the reflection mode (light from the viewer's side) travels through the light diffusing element 31 twice.

Therefore, if the haze value (the degree to which light is diffused) of the light diffusing element 31 is optimized for the light which is used for displaying in the transmission mode, the light which is used for displaying in the reflection mode is excessively diffused while traveling through the light diffusing element twice, thus resulting in a dark displaying in the reflection mode.

On the other hand, if the haze value of the light diffusing element 31 is set to be weaker so as not to result in a dark displaying in the reflection mode, the light which is used for displaying in the transmission mode travels through the light diffusing element 31 only once and therefore is not sufficiently diffused. As a result, the viewing angle cannot be sufficiently broadened with respect to displaying in the transmission mode.

Moreover, in the liquid crystal display device 100 of the present preferred embodiment, a plurality of light diffusing elements 31 and 32 are used, and therefore the haze value of each light diffusing element can be decreased as compared to the liquid crystal display device 600 in which only one light diffusing element 31 is used. Hence, the luminance, contrast ratio, and color reproducibility (expressed by an NTSC ratio, for example) can be improved. The reason thereof will be described with reference to FIGS. 4A and 4B.

Figure 4A:
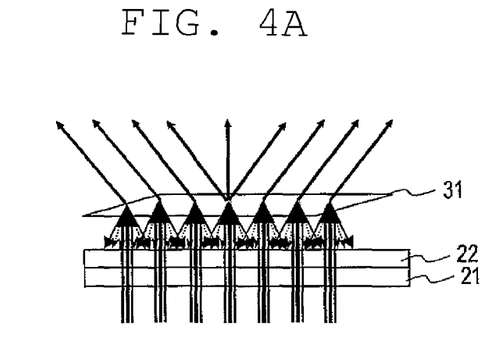
FIG. 4A is a diagram schematically showing light travel in the case where a light diffusing element with a large haze value is used.

As shown in FIG. 4A, when the haze value of the light diffusing element 31 is large, there is a strong backscatter. Therefore, there is a large decrease in the amount of light outgoing toward the viewer's side, and there is a lot of light (stray light) which again enters the front substrate 22. Therefore, a decrease in luminance, a decrease in contrast ratio, and a decrease color reproducibility will occur.

Figure 4B:
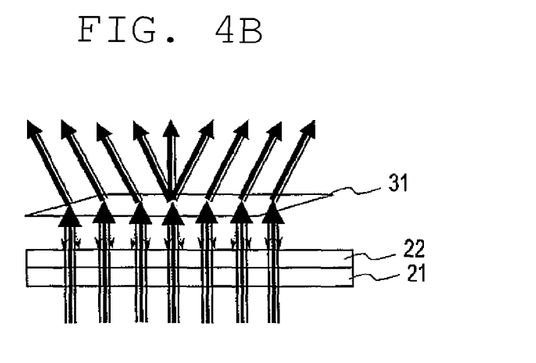
FIG. 4B is a diagram schematically showing light travel in the case where a light diffusing element with a small haze value is used.

On the other hand, as shown in FIG. 4B, when the haze value of the light diffusing element 31 is small, there is little backscatter. Therefore, there is little decrease in the amount of light outgoing toward the viewer's side, and there is little light (stray light) which again enters the front substrate 22. Therefore, decrease in luminance, decrease in contrast ratio, and decrease in color reproducibility are unlikely to occur.

Figure 5:
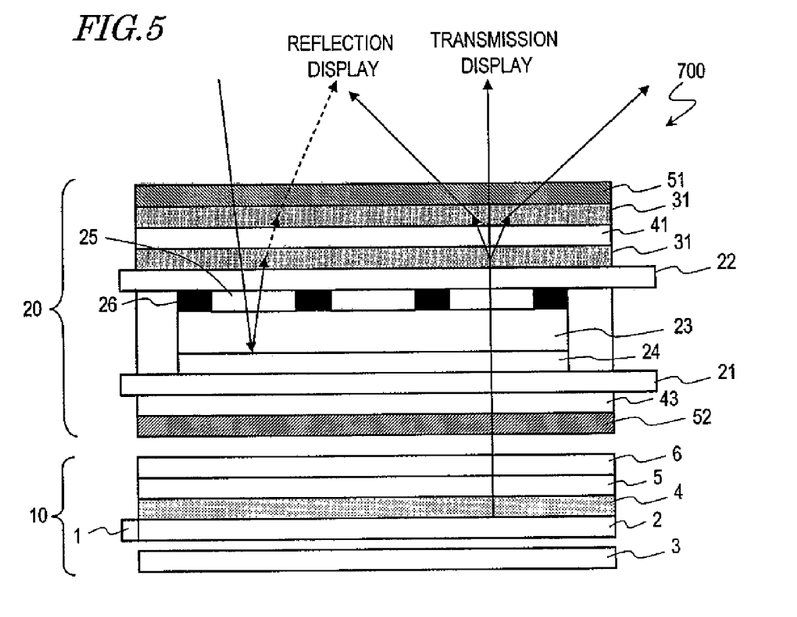
FIG. 5 is a cross-sectional view schematically showing a liquid crystal display device in which two light diffusing elements are disposed at the viewer's side of a liquid crystal layer.

Note that, if two light diffusing elements 31 are disposed at the viewer's side of the liquid crystal layer 23, as in a liquid crystal display device 700 shown in FIG. 5, the haze value of each light diffusing element 31 can be reduced, whereby the luminance, contrast ratio, and color reproducibility can be improved. However, in this case, the number of times of traveling through the light diffusing elements 31 differs between the light which is used for displaying in the transmission mode and the light which is used for displaying in the reflection mode. Specifically, light travels through the light diffusing elements 31 only twice in the transmission mode, whereas light travels through the light diffusing elements 31 four times in the reflection mode. Therefore, problems similar to those of the liquid crystal display device 600 will occur.

Now, a specific structure and preferable construction for the first light diffusing element 31 and the second light diffusing element 32 will be described.

Figure 6:
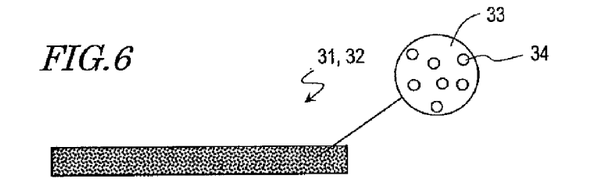
FIG. 6 is a diagram showing an example of first and second light diffusing elements to be used in a liquid crystal display device according to the present invention.

For example, the first light diffusing element 31 and the second light diffusing element 32 are diffusion films utilizing internal scatter, as shown in FIG. 6. The first light diffusing element 31 (or the second light diffusing element 32), which is a diffusion film (also referred to as a "diffuser"), is constructed from a matrix 33 which is composed of a resin material and particles 34 which are dispersed within the matrix 33, as shown partially enlarged in FIG. 6. The particles 34 have a refractive index which is different from the refractive index of the matrix 33, and light is diffused due to scatter being caused by a difference in refractive index between the matrix 33 and the particles 34. Note that, without being limited to the exemplified diffusion films, various light diffusing elements may be used as the first light diffusing element 31 and the second light diffusing element 32.

The haze values (parameters representing the degree to which light is diffused) of the first light diffusing element 31 and the second light diffusing element 32 are to be appropriately set depending on the specifications of the liquid crystal display panel 20, desired display characteristics, and the like.

In order that the light which is used for the transmission mode is uniformly modulated by the liquid crystal layer 23, it is preferable that the haze value of the second light diffusing element 32 is not too large, and it is preferable that the haze value of the first light diffusing element 31 is larger than the haze value of the second light diffusing element 32.

Figure 7:
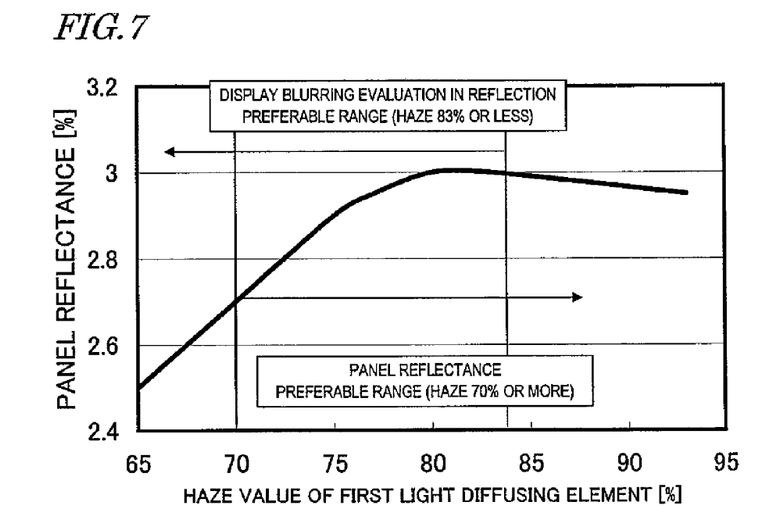
FIG. 7 is a graph showing a relationship between the haze value and the panel reflectance of the first light diffusing element.

FIG. 7 shows a relationship between the haze value of the first light diffusing element 31 and the light reflectance of the liquid crystal display panel 20 (hereinafter simply referred to as a "panel reflectance"). As can be seen from FIG. 7, when the haze value is less than about 70%, the panel reflectance becomes lower than the maximum reflectance (near a haze value of about 80%) by about 10% or more. Therefore, from the standpoint of ensuring a high panel reflectance, it is preferable that the haze value of the first light diffusing element 31 is about 70% or more, for example.

Moreover, display blurring in the reflection mode was evaluated by visual inspection, while varying the haze value of the first light diffusing element 31. When the haze value exceeded about 83%, more than tolerable display blurring occurred. Thus, it is preferable that the haze value of the first light diffusing element 31 is about 83% or less, for example.

Figure 8:
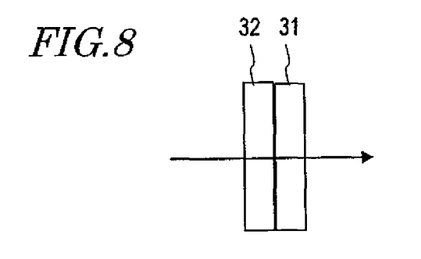
FIG. 8 is a diagram showing a state in which the first light diffusing element and the second light diffusing element are overlaid in order to measure an overlaid haze value.
Figure 9:
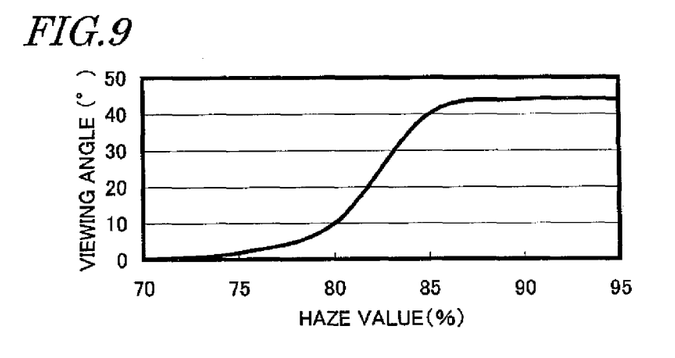
FIG. 9 is a graph showing a relationship between the overlaid haze value and the viewing angle.

Moreover, in order to evaluate the viewing angle broadening effect due to the first light diffusing element 31 and the second light diffusing element 32, the inventors have studied the relationship between an haze value (hereinafter referred to as an "overlaid haze value") of what is obtained by overlaying the first light diffusing element 31 and the second light diffusing element 32 as shown in FIG. 8 and the viewing angle broadening effect. The results are shown in FIG. 9. FIG. 9 is a graph showing a relationship between the overlaid haze value and the viewing angle. The overlaid haze value can be measured with Hazemeter NDH2000 manufactured by NIPPON DENSHOKU INDUSTRIES CO., LTD., for example. Note that the viewing angle shown in FIG. 9 is in an angular range with a contrast ratio of 2 or more, along a certain direction in the display surface (e.g., the up-down direction).

As can be seen from FIG. 9, when the overlaid haze value was about 85% or more, a viewing angle of about 40° or more was obtained, indicative of a remarkable viewing angle broadening effect. Therefore, it is preferable that the haze value of the first light diffusing element 31 and the haze value of the second light diffusing element 32 are set so that the overlaid haze value (which is different from an arithmetic sum of the individual haze values of the first light diffusing element 31 and the second light diffusing element 32) is about 85% or more. As has already been described, it is preferable that the haze value of the first light diffusing element 31 is no less than about 70% and no more than about 83%, for example. With the first light diffusing element 31 having a haze value in such a range, the haze value of the second light diffusing element 32 may be set to about 14% or more, whereby it is ensured that the overlaid haze value is about 85% or more, for example.

Moreover, as shown in FIG. 1, it is preferable that the first light diffusing element 31 and the second light diffusing element 32 are positioned between the liquid crystal layer 23 and the polarizing plates 51 and 52. In other words, it is preferable that the polarizing plate 51 is disposed at the viewer's side of the first light diffusing element 31 and that the polarizing plate 52 is disposed at the opposite side of the second light diffusing element 32 from the viewer. The reason thereof is described below.

Firstly, by providing the first light diffusing element 31 between the polarizing plate 51 and the liquid crystal layer 23, it becomes possible to position the polarizing plate 51 at the outermost surface on the viewer's side. Therefore, even when the liquid crystal display panel 20 is irradiated with strong external light, whitening out of the display is unlikely to occur.

Moreover, when the second light diffusing element 32 is provided between the polarizing plate 52 and the liquid crystal layer 23, backscatter light from the second light diffusing element 32 can be absorbed by the polarizing plate 52. As a result, stray light can be reduced, whereby decrease in luminance, decrease in contrast ratio, and decrease in color reproducibility can be prevented.

Moreover, when the second light diffusing element 32 is provided between the polarizing plate 52 and the liquid crystal layer 23 and furthermore the phase difference plates 43 and 44 are disposed between the second light diffusing element 32 and the polarizing plate 52, light will travel through the phase difference plates 43 and 44 before being diffused by the second light diffusing element 32. As a result, optical compensation by the phase difference plates 43 and 44 is suitably performed, so that a remarkable effect of broadening the viewing angle can be obtained.

Figure 10:
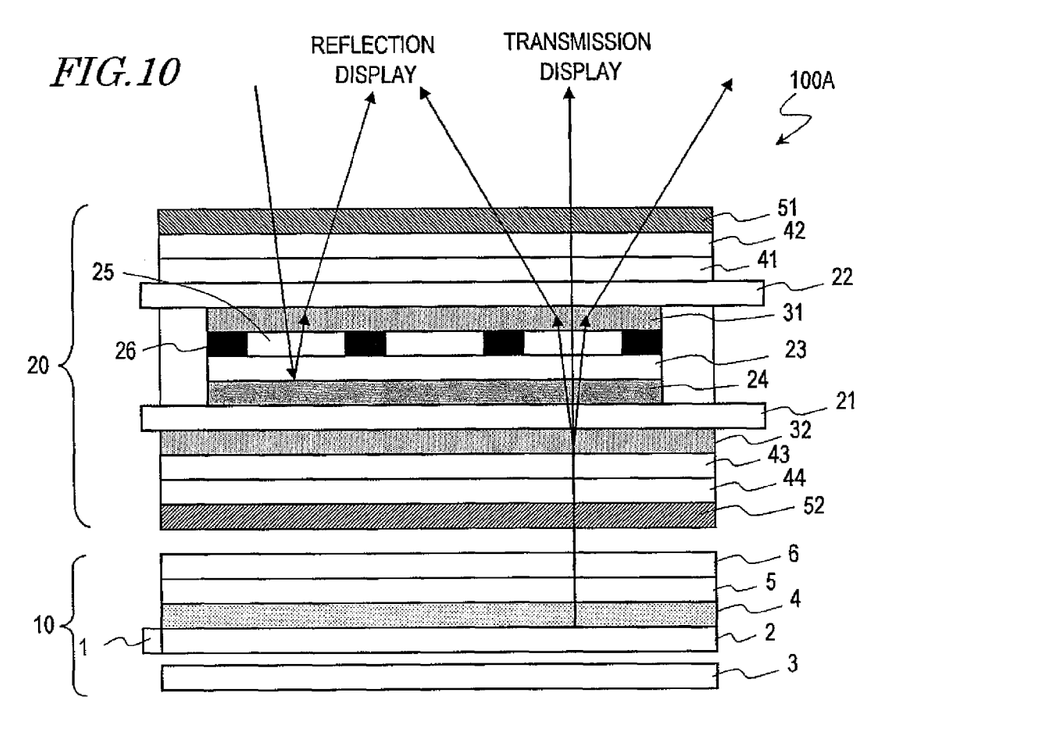
FIG. 10 is a cross-sectional view schematically showing another liquid crystal display device according to a preferred embodiment of the present invention.

In the construction shown in FIG. 1, the first light diffusing element 31 is preferably disposed at the viewer's side of the front substrate 22. However, as in a liquid crystal display device 100A shown in FIG. 10, the first light diffusing element 31 may be disposed between the front substrate 22 and the liquid crystal layer 23. When the first light diffusing element 31 is provided between the front substrate 22 and the liquid crystal layer 23, the distance from the liquid crystal layer 23 to the first light diffusing element 31 is shortened, so that display blurring becomes unlikely to occur.

Figure 11:
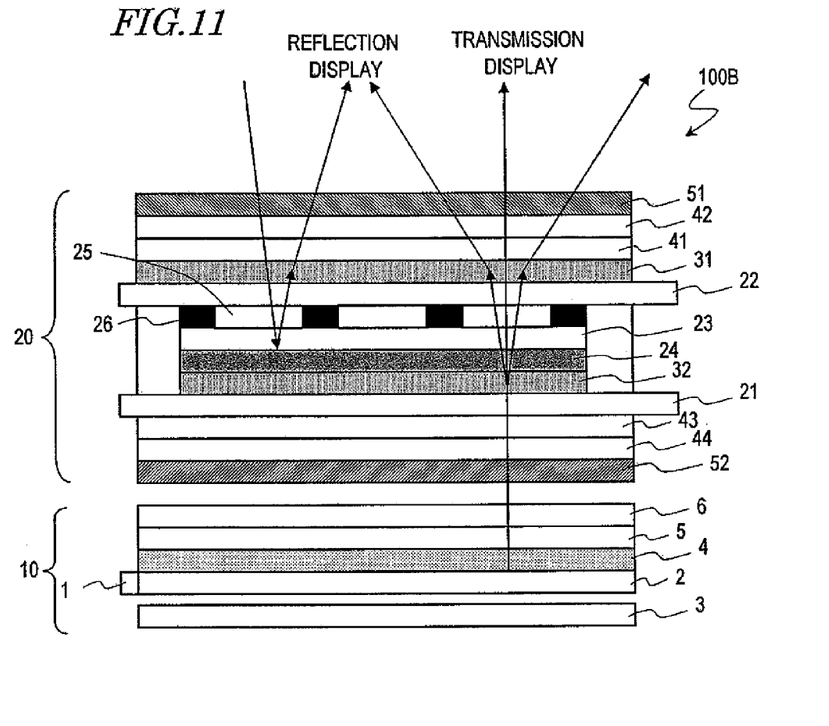
FIG. 11 is a cross-sectional view schematically showing another liquid crystal display device according to a preferred embodiment of the present invention.

In the construction shown in FIG. 1, the second light diffusing element 32 is disposed at the opposite side of the rear substrate 21 from the viewer. However, as in a liquid crystal display device 100B shown in FIG. 11, the second light diffusing element 32 may be disposed between the rear substrate 21 and the liquid crystal layer 23.

Figure 12:
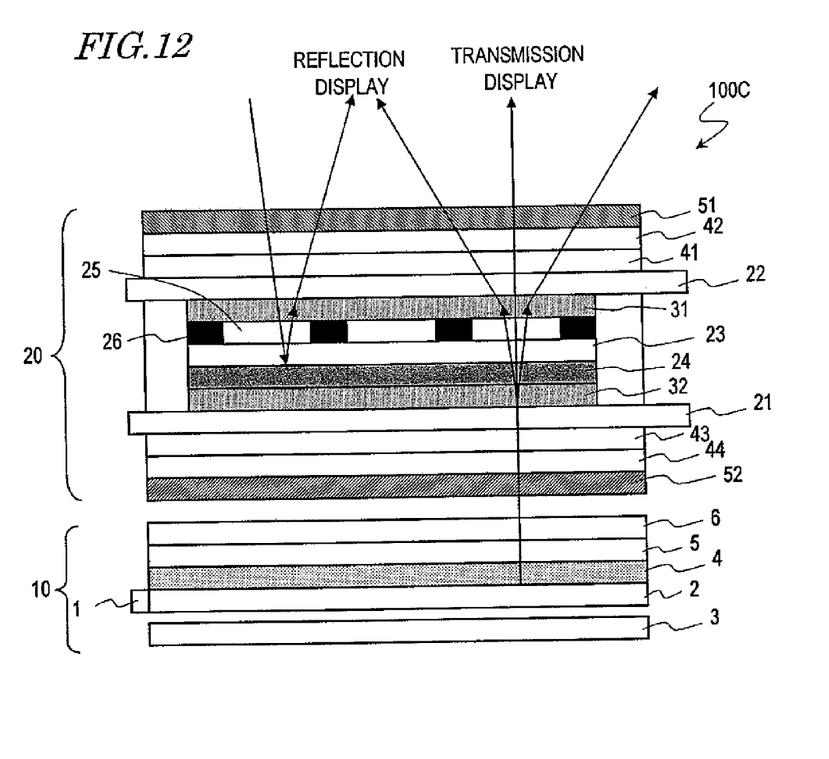
FIG. 12 is a cross-sectional view schematically showing another liquid crystal display device according to a preferred embodiment of the present invention.

Furthermore, as in a liquid crystal display device 100C shown in FIG. 12, the first light diffusing element 31 may be provided between the front substrate 22 and the liquid crystal layer 23 and also the second light diffusing element 32 may be provided between the rear substrate 21 and the liquid crystal layer 23. In this construction, too, the distance from the liquid crystal layer 23 to the first light diffusing element 31 can be shortened, whereby display blurring can be prevented.

Without limitation to what is exemplified, various backlights which are capable of emitting highly directive light can be used as the illuminator 10. In order to obtain a higher display quality, it is preferable to use a backlight which is able to emit light with a higher directivity. Specifically, when the illuminator 10 has an intensity distribution such that the luminance in directions at an angle of about 30° or more with respect to the display surface normal direction is about 3% or less of the luminance in the display surface normal direction, a sufficiently high contrast ratio can be easily realized.

Figure 13A:
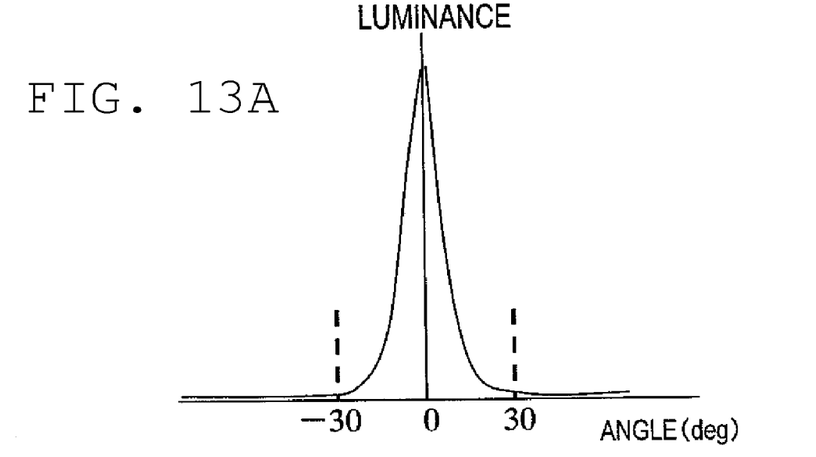
FIGS. 13A, 13B and 13C are graphs showing examples of intensity distribution of light emitted from an illuminator.
Figure 13B:
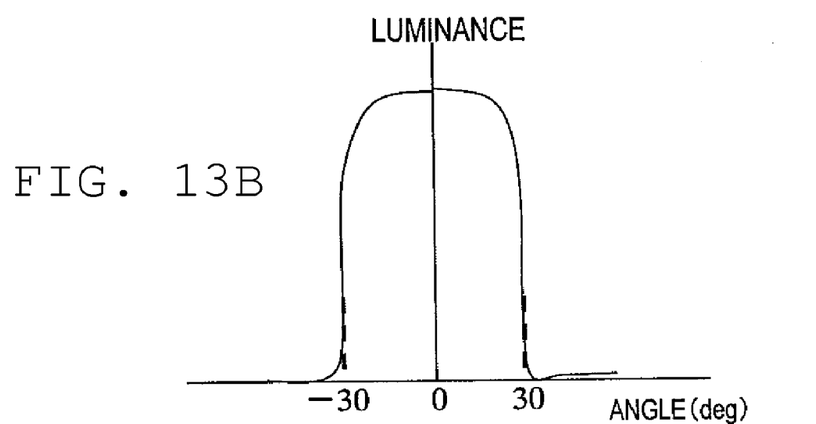

FIGS. 13A and 13B show preferable examples of intensity distribution of the illuminator 10. In the intensity distribution shown in FIG. 13A, the luminance is highest in the display surface normal direction, and the luminance rapidly lowers as the angle increases. On the other hand, in the intensity distribution shown in FIG. 13B, a relatively high luminance is maintained from the display surface normal direction to near 30°. In both of the intensity distributions shown in FIGS. 13A and 13B, the luminance in directions at an angle of about 30° or more with respect to the display surface normal direction is about 3% or less of the luminance in the display surface normal direction (0°). Therefore, by using illuminators 10 having such intensity distributions, an excellent display quality can be obtained.

Figure 13C:
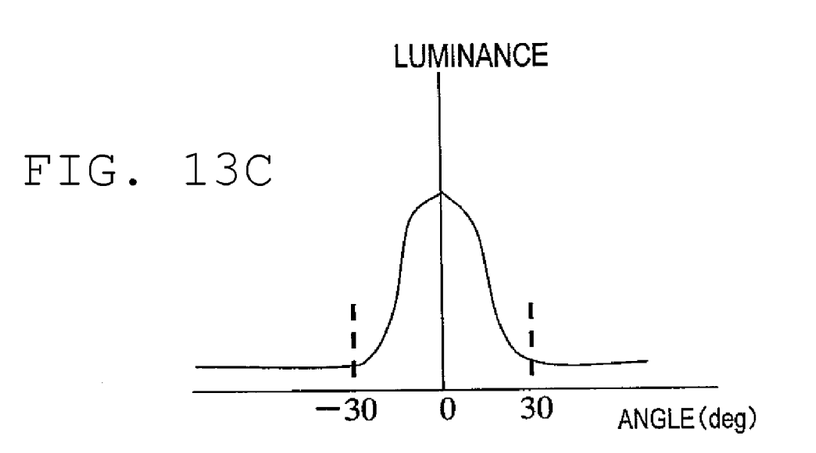

Another exemplary intensity distribution is shown in FIG. 13C. In the intensity distribution shown in FIG. 13C, the luminance in directions at an angle of about 30° or more with respect to the display surface normal direction is equal to or less than about 8% to about 13% of the luminance in the display surface normal direction (0°). Even in the case of using an illuminator 10 having such an intensity distribution, a sufficient display quality can be obtained.

Preferred Embodiment 2

Figure 14:
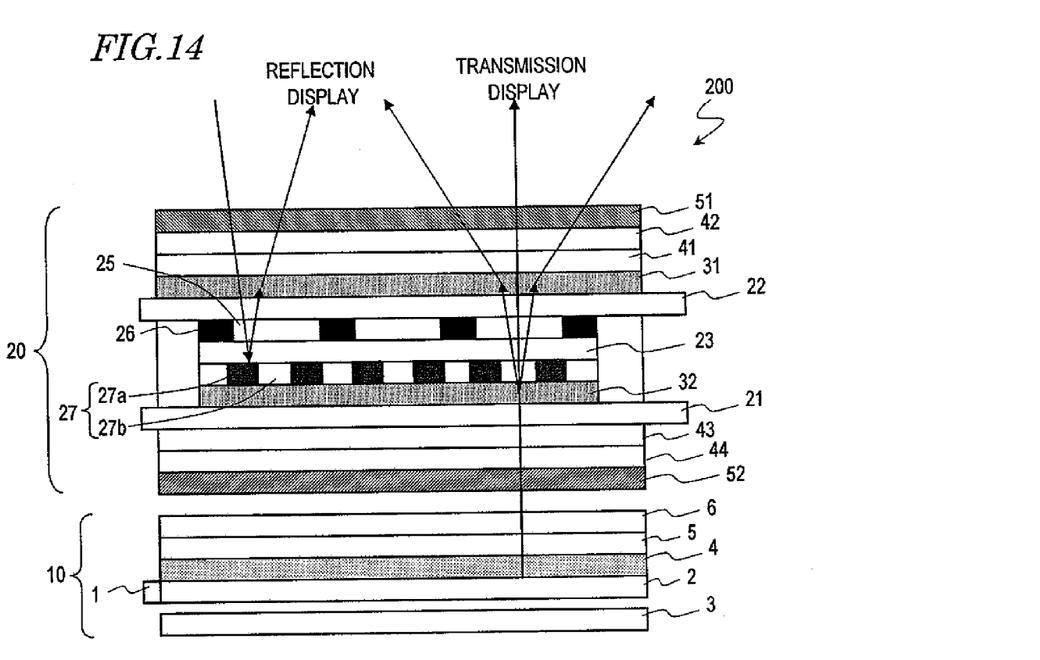
FIG. 14 is a cross-sectional view schematically showing another liquid crystal display device according to a preferred embodiment of the present invention.

With reference to FIG. 14, a transflective-type liquid crystal display device 200 according to the present preferred embodiment will be described. Hereinafter, differences from the liquid crystal display device 100 of Preferred Embodiment 1 will be mainly described.

The liquid crystal display device 200 of the present preferred embodiment includes a light reflecting layer 27 which is different in structure from the light reflecting layer 24 of the liquid crystal display device 100 of Preferred Embodiment 1. The light reflecting layer 27 of the liquid crystal display device 200 is not a half mirror, but as shown in FIG. 14, includes light reflecting portions 27a which reflect light and light transmitting portions 27b which transmit light.

The light reflecting portions 27a are preferably composed of a metal having a high light reflectance, e.g., aluminum, and the light transmitting portions 27b are apertures where no such metal film is formed (removed). The light reflecting portions 27a are formed to be thicker than the light reflecting layer 24 of Preferred Embodiment 1, which is a half mirror, so as to be able to reflect light with a sufficiently high reflectance.

In the liquid crystal display device 200 having the light reflecting layer 27 as described above, the regions where the light reflecting portions 27a are disposed function as reflection regions which perform displaying in the reflection mode, whereas the regions where the light transmitting portions 27b are disposed function as transmission regions which perform displaying in the transmission mode. In other words, each pixel is divided into reflection region(s) and transmission region(s).

In the liquid crystal display device 200, too, the viewing angle characteristics in displaying in the transmission mode can be sufficiently improved, and yet bright displaying in the reflection mode can be realized, because the first light diffusing element 31 which is disposed at the viewer's side of the liquid crystal layer 23 and the second light diffusing element 32 which is disposed at the opposite side of the liquid crystal layer 23 from the viewer are provided.

As in the present preferred embodiment, in the case where the light reflecting layer 27 containing the light reflecting portions 27a and the light transmitting portions 27b is used, it is preferable the second light diffusing element 32 is disposed between the liquid crystal layer 23 and the rear substrate 21, as is also shown in FIG. 14.

If the second light diffusing element 32 is disposed at the opposite side of the rear substrate 21 from the viewer, the distance from the second light diffusing element 32 to the light reflecting layer 27 becomes long, so that portions of the light which is emitted from the illuminator 10 and diffused by the second light diffusing element 32 (portions of the light which should enter a transmission region of the pixel) will enter the light reflecting portions 27a and be reflected. As a result, the efficiency of light utility is lowered, resulting in a dark displaying in the transmission mode.

On the other hand, when the second light diffusing element 32 is interposed between the liquid crystal layer 23 and the rear substrate 21, the distance from the second light diffusing element 32 to the light reflecting layer 27 can be shortened, thus preventing portions of light which is used for displaying in the transmission mode from entering the light reflecting portions 27a. As a result, the efficiency of light utility is improved, and it is possible to perform bright displaying in the transmission mode.

Figure 15:
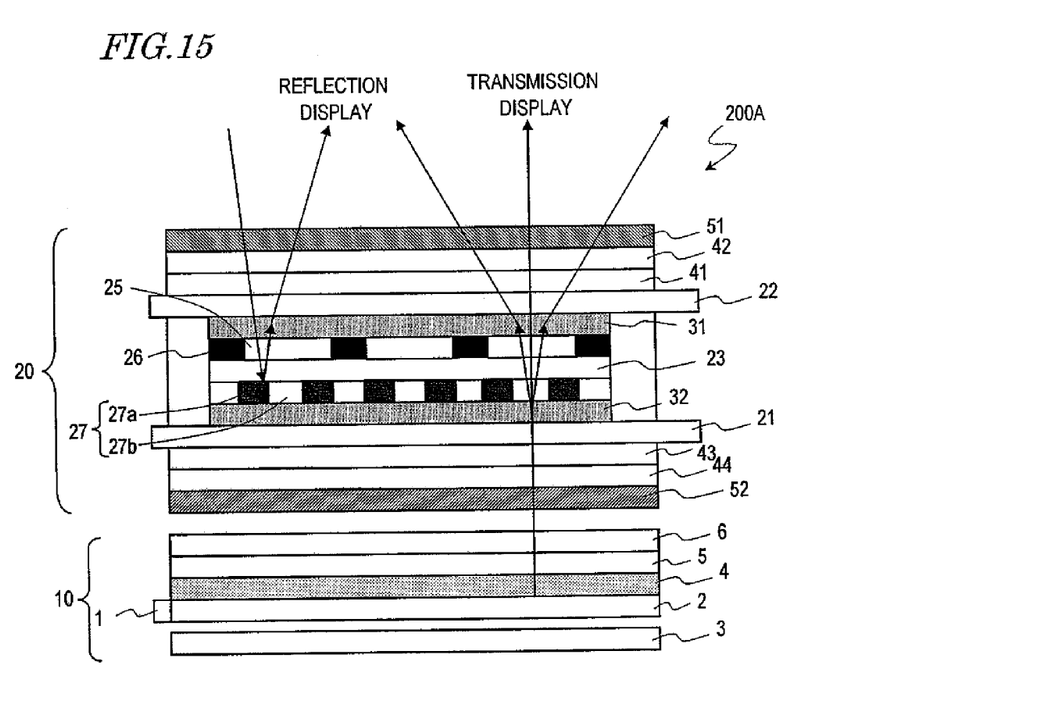
FIG. 15 is a cross-sectional view schematically showing another liquid crystal display device according to a preferred embodiment of the present invention.

In the construction shown in FIG. 14, the first light diffusing element 31 is disposed at the viewer's side of the front substrate 22. However, in order to prevent displaying blurring, as in a liquid crystal display device 200A shown in FIG. 15, the first light diffusing element 31 may be interposed between the front substrate 22 and the liquid crystal layer 23.

According to various preferred embodiments of the present invention, in a liquid crystal display device of a transflective type, the viewing angle characteristics of displaying in the transmission mode can be sufficiently improved, and yet bright displaying in the reflection mode can be realized. In other words, it is possible to reconcile the transmission mode with a wide viewing angle and the reflection mode with a high reflectance.

The liquid crystal display device according to various preferred embodiments of the present invention is suitably used for transmission-type liquid crystal display devices having backlights in general, and in particular, suitably used for liquid crystal display devices of display modes of poor viewing angle characteristics (e.g., STN mode, TN mode, ECB mode).

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device of a transflective type comprising:
   a liquid crystal display panel including a pair of substrates and a liquid crystal layer provided between the pair of substrates; and
   an illuminator arranged to emit light toward the liquid crystal display panel; wherein
   the liquid crystal display device is arranged to display in a transmission mode by using light from the illuminator and display in a reflection mode by using light from a viewer's side;
   the liquid crystal display panel includes a first light diffusing element disposed at the viewer's side of the liquid crystal layer and a second light diffusing element disposed at an opposite side of the liquid crystal layer from the viewer; and
   the liquid crystal display panel further includes a first polarizer disposed at the viewer's side of the first light diffusing element and a second polarizer disposed at an opposite side of the second light diffusing element from the viewer.

2. The liquid crystal display device of claim 1, wherein the first light diffusing element has a haze value which is larger than a haze value of the second light diffusing element.

3. The liquid crystal display device of claim 1, wherein the first light diffusing element has a haze value of about 83% or less.

4. The liquid crystal display device of claim 1, wherein the first light diffusing element has a haze value of about 70% or more.

5. The liquid crystal display device of claim 1, wherein,
   the pair of substrates are a first substrate disposed at the viewer's side of the liquid crystal layer and a second substrate disposed at the opposite side of the liquid crystal layer from the viewer; and
   the first light diffusing element is disposed at the viewer's side of the first substrate.

6. The liquid crystal display device of claim 1, wherein,
   the pair of substrates are a first substrate disposed at the viewer's side of the liquid crystal layer and a second substrate disposed at the opposite side of the liquid crystal layer from the viewer; and
   the first light diffusing element is interposed between the first substrate and the liquid crystal layer.

7. The liquid crystal display device of claim 1, wherein,
   the pair of substrates are a first substrate disposed at the viewer's side of the liquid crystal layer and a second substrate disposed at the opposite side of the liquid crystal layer from the viewer; and
   the second light diffusing element is disposed at the opposite side of the second substrate from the viewer.

8. The liquid crystal display device of claim 1, wherein,
   the pair of substrates are a first substrate disposed at the viewer's side of the liquid crystal layer and a second substrate disposed at the opposite side of the liquid crystal layer from the viewer; and
   the second light diffusing element is interposed between the second substrate and the liquid crystal layer.

9. The liquid crystal display device of claim 1, wherein the liquid crystal display panel further includes a light reflecting layer interposed between the liquid crystal layer and the second light diffusing element.

10. The liquid crystal display device of claim 1, wherein the illuminator has an intensity distribution such that a luminance in directions at an angle of about 30° or more with respect to the display surface normal direction is about 13% or less of a luminance in the display surface normal direction.

11. The liquid crystal display device of claim 1, wherein the illuminator has an intensity distribution such that a luminance in directions at an angle of about 30° or more with respect to the display surface normal direction is about 3% or less of a luminance in the display surface normal direction.

12. The liquid crystal display device of claim 1, wherein the illuminator includes a light source and a directivity controlling element arranged to control directivity of light emitted from the light source.

13. A liquid crystal display device of a transflective type comprising:
   a liquid crystal display panel including a pair of substrates and a liquid crystal layer provided between the pair of substrates; and
   an illuminator arranged to emit light toward the liquid crystal display panel; wherein
   the liquid crystal display device is arranged to display in a transmission mode by using light from the illuminator and display in a reflection mode by using light from a viewer's side;
   the liquid crystal display panel includes a first light diffusing element disposed at the viewer's side of the liquid crystal layer and a second light diffusing element disposed at an opposite side of the liquid crystal layer from the viewer; and a haze value of the first light diffusing element and a haze value of the second light diffusing element are set so that a haze value of what is obtained by overlaying the first light diffusing element and the second light diffusing element is about 85% or more.

* * * * *